United States Patent Office 3,422,136
Patented Jan. 14, 1969

3,422,136
PROCESS FOR PRODUCTION OF BIS(β-HYDROXYALKYL) TEREPHTHALATE
Tadao Tsutsumi, Mishima-shi, Japan, assignor to Toyo Rayon Kabushiki Kaisha, Tokyo, Japan
No Drawing. Filed Apr. 20, 1964, Ser. No. 361,294
Claims priority, application Japan, Apr. 24, 1963, 38/20,937
U.S. Cl. 260—475            6 Claims
Int. Cl. C07c 67/00; C07c 69/82

ABSTRACT OF THE DISCLOSURE

A process for the manufacture of bis(β-hydroxyalkyl) terephthalate which comprises suspending or dissolving terephthalonitrile in a member selected from the group consisting of water and a water-containing organic solvent, heating the resulting suspension or solution to a temperature of 50–200° C., and while maintaining the reaction mixture at that temperature, feeding in an alkylene oxide to react therewith, cooling the reaction solution and recovering the bis(β-hydroxyalkyl) terephthalate produced.

---

This invention relates to a process of manufacturing bis(β-hydroxyalkyl) terephthalate which is characterized by reacting terephthalonitrile with water and alkylene oxide. Heretofore, it has been unknown that bis(β-hydroxyalkyl) terephthalate can be manufactured by such reaction. Consequently the present invention is an entirely novel process.

The products obtained by the present invention represent either the monomer or low polymer of high-quality bis(β-hydroxyalkyl) terephthalate. While they are, of course, not limited as to applications, their preferable uses are as raw materials for production of polyalkylene terephthalate or other polyesters mainly consisting of polyalkylene terephthalate. The process of the present invention is applicable as the stage reaction step in manufacture of the polyester.

The object of the present invention is to provide a means of manufacturing bis(β-hydroxyalkyl) terephthalate by a novel reaction process. More particularly, the object of the present invention is to provide a new industrial process of manufacturing bis(β-hydroxyalkyl) terephthalate, especially bis(β-hydroxyethyl) terephthalate which is suitable as raw material for polyalkylene terephthalate or other polyesters mainly consisting of polyalkyleene terephthalate.

There have been a number of known methods of manufacturing polyalkylene terephthalate. Among them are the process of reacting terephthalic acid with alklylene glycol, the process involving ester exchange between dialkyl terephthalate and alkylene glycol, the process of reacting terephthalic acid with alkylene oxide and the process of reacting terephthalonitrile with water and alkylene glycol.

Among the polyalkylene terephthalates, polyethylene terephthalate, in particular, which represents an ethylene glycol ester polymer containing terephthalic acid is a high polymer compound of industrial import.

The existing industrial processes of producing polyethylene terephthalate comprise either ester exchange between dimethyl terephthalate and ethylene glycol or polymerization of bis(β-hydroxyethyl) terephthalate obtained by direct esterification of terephthalic acid by ethylene glycol.

These methods involving terephthalic acid as raw material which is extremely difficult to refine require either a step of purposely passing through the stage of methyl ester or a considerably expensive refining process.

In recent years a process has been developed to synthesize terephthalonitrile by a single step, that is, by carrying out gaseous phase air oxidation of p-xylene in the presence of ammonia. Since terephthalonitrile can be converted into bis(β-hydroxyethyl) terephthalate by a single stage through reaction with water and ethylene glycol, it deserves attention as raw material for polyethylene terephthalate. Furthermore, terephthalonitrile is capable of recrystallization by methanol, ethanol, p-xylene, dimethyl sulfoxide and many other solvents and also of easy purification by such processes as sublimation and azeotropic distillation.

A number of approaches have been made as to the reaction of terephthalate. Among the known methods to obtain bis(β-hydroxyethyl) terephthalate is a British Patent No. 800,875 (1958) which comprises reacting terephthalonitrile with water and ethylene glycol at temperatures over 150° C.

As a result of intensive studies in production of polyalkylene terephthalate from the aforementioned terephthalonitrile, the inventor has accomplished the present invention by discovering a surprising new fact that if terephthalonitrile is contacted with water and alkylene oxide the subject reaction proceeds even at low temperatures, for example, below 150° C. to produce bis(β-hydroxyalkyl) terephthalate.

The process of the present invention comprises bringing terephthalonitrile into close contact with water and alkylene oxide for reaction under conditions which may be selected within a broad range, and thereafter separating bis(β-hydroxyalkyl) terephthalate produced. While the alkylene oxide used represents ethylene oxide and propylene oxide, a particular preference is usually given to ethylene oxide.

The aforesaid conventional method which involves reaction of terephthalonitrile with water and alkylene glycol to synthesize polyalkylene terephthalate requires appreciably high reaction temperatures of over 150° C. This is not only because the reaction speed among the three components is extremely slow at low temperature, but also because, at such temperatures, terephthalonitrile has a considerably small solubility in alkylene glycol. Thus a high temperature is applied to obtain a practical reaction speed. However, this incidentally develops undesirable side reactions and decomposition reaction, resulting in the objectionable coloring of alkylene glycol ester of terephthalic acid produced. In contrast, reaction of terephthalonitrile with water and alkylene oxide as claimed by the present invention does not always require so high temperatures as over 150° C., but proceeds at a sufficiently practical speed even at lower temperatures. The resultant restriction of side reactions and decomposition reactions permits synthesis of terephthalic alkylene glycol ester free from coloring without any further purification of the bis(β-hydroxyalkyl) terephthalate produced.

Here is a preferable method of practising the process of the present invention. The contact reaction of terephthalonitrile with water and alkylene oxide involves the use as diluent of water or proper organic solvents inert to the subject reaction. Said organic solvents may include alcohols such as methyl alcohol, ethyl alcohol, isopropyl alcohol, allyl alcohol, n-butyl alcohol, sec-butyl alcohol, isoamyl alcohol, ethylene glycol, propylene glycol, benzyl alcohol, methylphenyl carbinol, and cyclohexanol; ketones such as acetone, methylethyl ketones, diethyl ketone, cyclopentanone, cycloheptanone and cyclohexanone; aliphatic hydrocarbons such as n-hexane, pentane, isopentane, n-heptane, octane and cyclohexane; aromatic hydrocarbons such as benzene, toluene, ethylbenzene, xylene, p-cymene and mesitylene; and ethers such as n-propyl ether, dioxane, isobutyl ether, phenetole and cineole. Suspension or dissolution of reactants in any of the foregoing materials assists their uniform and close contact and conveniently helps reaction to proceed smoothly. The subject reaction is free from any particular restrictions as to its conditions including temperature, pressure, time or catalyst, and may be conducted within any broad range of conditions as may be thought fit. Speaking of temperature for instance, the reaction may proceed at appreciably low temperatures, but the usual range of reaction temperature lies between 50° and 200° C., preferably 70 and 120° C. The subject reaction may also be conducted even in the absence of catalyst, but can proceed at a substantially higher rate by the use of inorganic or organic weak basic materials including sodium acetate, sodium carbonate, lithium carbonate, magnesium acetate, magnesium chloride, magnesium oxide, barium acetate, barium chloride, calcium acetate, calcium oxide or other salts or oxides of alkali metals or alkali earth metals, or alkali alkoxides such as sodium methoxide and sodium ethoxide, or organic basic groups such as pyridine, quinoline, trimethylamine and triethylamine. The preferable weight ratio of reactants represents 2 mol of water per nitrile group (where water is not used as reaction medium) and 1 to 5 mol of alkylene oxide per nitrile group.

The object product of bis($\beta$-hydroxyalkyl) terephthalate which, upon completion of the reaction, settles out in the crystalline form by cooling the reaction liquid can be removed with high purity by an ordinary means of separation, for example, filtration.

As described above, the present invention is based on an entirely new reaction process, and no same method has been known in the past. However, the outstanding features of the reaction of the present invention may be further illustrated in comparison with the following examples of different known reactions which may be used as reference.

(A) British Patent No. 800,875 which comprises reacting terephthalonitrile with water and ethylene glycol in the presence of alkali catalyst at temperatures over 150° C. to synthesize bis($\beta$-hydroxyethyl) terephthalate.

(B) Japanese Patent No. 193,097 which consists in reacting alkylene oxide with terephthalic acid to synthesize polyalkylene terephthalate.

(C) P. H. Groggins, "Unit Process in Organic Synthesis," McGraw-Hill (1938), p. 569, which involves reacting nitrile with water and alcohol to synthesize an ester. The literature refers to an example in which acetonitrile is reacted with water and ethylalcohol to synthesize ethyl acetate by a single step.

(D) R. Oda et al., Bull. Chem. Soc. Japan, 35, 1219 (1962), which deals with a process of reacting nitrile with ethylene oxide with concentrated sulfuric acid as catalyst to synthesize oxazolin. The paper contains an example in which benzonitrile and ethylene oxide are reacted for long in the presence of concentrated sulfuric acid as catalyst at low temperatures of 5 to 20° C. to obtain 2-phenyl-2 oxazolin and bezamide.

Of the known reaction processes, the foregoing four examples from (A) to (D) may seem to be most closely related to the present invention, but essentially are entirely different from the process of the present invention. Thus it is impossible to anticipate the process of the present invention from them.

Here are some reasons why the present invention is believed to be a novel process. To begin with, the present invention proceeds at low temperatures of less than 150° C. as previously referred to, and can not be deemed as the same type of reaction as the aforementioned examples of (A) and (B).

It is well known that alkylene oxide is reacted with water to produce alkylene glycol. In fact, the industrial process of manufacturing alkylene glycol comprises hydrolysis of alklene oxide. However, it is impossible from the following fact to conclude that in the reaction process of the present invention, hydrolysis of alkylene oxide into alkylene glycol will naturally lead to the reaction of terephthalonitrile with alkylene glycol (as in Example (A)) to produce bis($\beta$-hydroxyalkyl) terephthalate; it is observed that even though alkylene glycol, particularly ethylene glycol, terephthalonitrile and water may be heated together to less than 150° C., no generation of ammonia or esterification occurs.

Next let us assume that the reaction of the present invention would involve a mechanism whereby terephthalonitrile was hydrolyzed into terephthalic acid which in turn would react with alkylene oxide as in Example (B), and consider the adequacy of such assumption. In fact, when terephthalonitrile suspended or dissolved in water or any of the aforementioned diluents is thermally reacted by the use as catalyst of weak alkaline material such as sodium acetate or magnesium oxide, no substantial growth of ammonia is observed, nor can be ascertained any formation of terephthalic acid. From this fact, the above assumption does not in any way account for the reaction mechanism involved in the process of the present invention.

In general, hydrolysis of aromatic nitrile proceeds fast in the first stage where nitrile turns into amide carboxylate, whereas it slows down in the second where the amide carboxylate is formed into carboxylic acid. This is known to be a rate determining step of the overall reaction time cycle. In the thermal reaction as referred to immediately above, terephthalonitrile, even though hydrolyzed, will only change into diamide terephthalate and hardly go further into terephthalic acid. On the other hand, diamide terephthalate is not only less soluble in the aforementioned solvents than terephthalonitrile and terephthalic acid, but also is so less reactive than even when heated with alkylene glycol to high temperatures, it does not react at all.

As explained above, the process of the present invention should be considered to produce an ester by an entirely different mechanism from those of Example (A) and (B). No literature or patents have been found which contain such examples of reaction.

Of the aforesaid examples, (C) and (D) respectively represent esterification of nitrile by alcohol and reaction of alkylene oxide with nitrile. Consequently they have no direct relation with manufacture of polyalkylene terephthalate and completely differ from the reaction of the present invention.

The reaction of the present invention is applicable to esterification of general nitriles including not only terephthalonitrile, but also isophthalonitrile, phthalonitrile and benzonitrile by reacting them with water and alkylene oxide.

The bis($\beta$-hydroxyethyl) terephthalate obtained by the process of the present invention produces colorless high quality polyethyleneterephthalate.

As described above, the reaction of the present invention is completely new in itself. This process easily produces high quality bis($\beta$-hydroxyalkyl) terephthalate with a good yield. Moreover, the product thus obtained can be used in manufacture of polyalkylene terephthalate without any further purification step and brings a considerably significant effect industrywise.

The present invention will be more clearly understood by referring to the examples which follow. It is to be

EXAMPLE 1

50 parts of terephthalonitrile, and 30 mol percent of magnesium oxide as catalyst suspended in 400 parts of water were introduced into a 1000 ml. three-necked flask provided with a reflux condenser, stirrer, thermometer and ethylene oxide feeder. The reactor which had been heated to 85 to 90° C. was charged with ethylene oxide at the rate of 6 parts per hour to conduct reaction at 90° C. After 10 hours' reaction, the reaction liquid was cooled to settle out crystals. The precipitated crystals were filtered by suction to obtain 79.5 parts of bis($\beta$-hydroxyethyl) terephthalate having a melting point of 108 to 110° C. This represented a conversion rate of 80.2% on the basis of the raw terephthalonitrile.

EXAMPLE 2

10 parts of terephthalonitrile and 40 parts of water were charged into a 100 ml three-necked flask equipped with a reflux condenser, stirrer, and ethylene oxide feeder. Reflux heating was applied at 100° C. while ethylene oxide was being introduced at the rate of 0.6 part per hour. Bis($\beta$-hydroxyethyl) terephthalate obtained after 10 hours' reaction indicated a 40% yield.

EXAMPLE 3

50 parts of terehpthalonitrile, 30 parts of water and 4 parts of sodium acetate were suspended in 500 parts of ethanol. The mass was introduced into the same apparatus as in Example 1 and heated to 80° C. Ethylene oxide was added at the rate of 6 parts per hour and reaction was continued for 15 hours. The crystals settling out by cooling the reaction liquid were filtered by suction to obtain 70.5 parts of bis($\beta$-hydroxyethyl) terephthalate having a melting point of 107 to 110° C.

EXAMPLE 4

50 parts of terephthalonitrile, 30 parts of water and 4 parts of sodium methylate were suspended in 300 parts of toluene. The mass was introduced into the same apparatus as in Example 1. 10 hours' reflux heating was continued at 110 C, while ethylene oxide was brought in at the rate of 6 parts per hour. The crystals settling out by cooling the reaction liquid were filtered by suction to obtain 69.4 parts of bis($\beta$-hydroxyethyl) terephthalate having a melting point of 104 to 108° C.

EXAMPLE 5

10 parts of terephthalonitrile, 40 parts of water and 1 part of magnesium oxide were introduced into an autoclave provided with the feeding and discharging tubes of ethylene oxide. After the air inside was replaced by nitrogen gas, the apparatus was pressurized to 10 kg./cm.$^2$ by nitrogen and heated to 150° C. When the temperature rose to 150 C. ethylene oxide was introduced into the autoclave through the feeder at the rate of 2 parts per hour. Unreacted ethylene oxide was drawn out of the autoclave through the discharge tube at the opposite and provided with a pressure-reducing valve. Bis($\beta$-hydroxyethyl) terephthalate obtained after 2 hours' reaction showed a yield of 94%.

EXAMPLE 6

10 parts of terephthalonitrile and 10 mol % of triethylamine as catalyst were suspended in 40 parts of water. The mass was charged into a 100 ml. three-necked flask equipped with a reflux condenser, stirrer, and ethylene oxide feeder. Reaction was continued at 90° C. for 10 hours while ethylene oxide was added at the rate of 1 part per hour. Upon completion of the reaction, the crystals settling out by cooling the reaction liquid were filtered by suction. Then 9.7 parts of bis($\beta$-hydroxyethyl) terephthalate having a melting point of 107 to 110° C. were obtained.

EXAMPLE 7

50 parts of terephthalonitrile, 30 mol percent of magnesium oxide as catalyst and 30 parts of water were suspended in 500 parts of sec-butyl alcohol. The mass was introduced into the same apparatus as in Example 1 and heated to 95° C. Reaction was continued for 15 hours while ethylene oxide was added at the rate of 6 parts per hour. The crystals settling out by cooling the reaction liquid were filtered by suction to obtain 81.3 parts of bis($\beta$-hydroxyethyl) terephthalate having a melting point of 108 to 109° C.

EXAMPLE 8

50 parts of terephthalonitrile, 5 parts of magnesium acetate as catalyst and 30 parts of water were suspended in 400 parts of methylethyl ketone. The mass was introduced into the same apparatus as in Example 1 and heated to 70° C. Reaction was continued for 15 hours while ethylene oxide was charged at the rate of 6 parts per hour. The crystals settling out by cooling the reacting liquid were filtered by suction to obtain 72.4 parts of bis($\beta$-hydroxyethyl) terephthalate.

EXAMPLE 9

10 parts of terephthalonitrile, 6 parts of water and 1 part of sodium carbonate as catalyst were suspended in 40 parts of n-heptane. The mass was introduced into the same apparatus as in Example 2 and heated to 88° C., and ethylene oxide was added at the rate of 1 part per hour. After 10 hours' reaction, the crystals settling out by cooling the reaction liquid were filtered by suction to obtain 10.8 parts of bis($\beta$-hydroxyethyl) terephthalate.

EXAMPLE 10

10 parts of terephthalonitrile, 6 parts of water and 1 part of lithium carbonate as catalyst were suspended in 40 parts of dioxane. The mass was introduced into the same apparatus as in Example 2. Reaction was continued by reflux heating for 15 hours. while ethylene oxide was charged at the rate of 0.6 part per hour. The crystals settling out by cooling the reaction liquid were filtered by suction to obtain 100 parts of bis($\beta$-hydroxyethyl) terephthalate.

I claim:

1. A process for manufacturing bis($\beta$-hydroxyalkyl) terephthalate by reacting terephthalonitrile with water and an alkylene oxide, which comprises dissolving or suspending the terephthalonitrile and water in a diluent, heating the resulting suspension or solution at a temperature of 70° C. to 120° C. passing the alkylene oxide into the mixture until the reaction is essentially complete, cooling the reaction mixture and recovering the product produced.

2. A process according to claim 1 wherein the diluent is selected from the group consisting of water and an organic solvent chemically inert to the reaction.

3. A process according to claim 1 wherein the reaction is conducted in the presence of a weak basic catalyst selected from the group consisting of inorganic and organic weak basic catalysts.

4. A process for manufacturing bis($\beta$-hydroxyethyl) terephthalate by reacting terephthalonitrile with water and ethylene oxide, which comprises suspending or dissolving the terephthalonitrile and water in a diluent selected from the group consisting of water and a water-containing organic solvent, heating the resulting suspension or solution at a temperature of 70° C. to 120° C. while passing ethylene oxide into the mixture until the reaction is complete, cooling the resulting mixture and recovering the product produced.

5. A process according to claim 4 wherein the reaction is conducted in the presence of a diluent selected from the group consisting of water, alcohols, ketones, aliphatic hydrocarbons, aromatic hydrocarbons and ethers.

6. A process according to claim 4 wherein the reaction is conducted in the presence of a weakly basic catalyst selected from the group consisting of alkali metal salts, alkali metal oxides, alkali earth metal salts, alkali earth metal oxides, alkali alkoxides, pyridine, quinoline, trimethylamine and triethylamine.

References Cited

UNITED STATES PATENTS 2,921,088  1/1960  Gasson et al. _____ 260—475

OTHER REFERENCES

Curme et al.: "Glycols," Reinhold Publishing Corp., N.Y., 1952, pp. 94–95.

LORRAINE A. WEINBERGER, *Primary Examiner.*

T. L. GALLOWAY, *Assistant Examiner.*